Dec. 18, 1934.  I. K. HUTCHINSON ET AL  1,984,412
WEIGHING SCALE
Filed Dec. 30, 1930   2 Sheets-Sheet 1
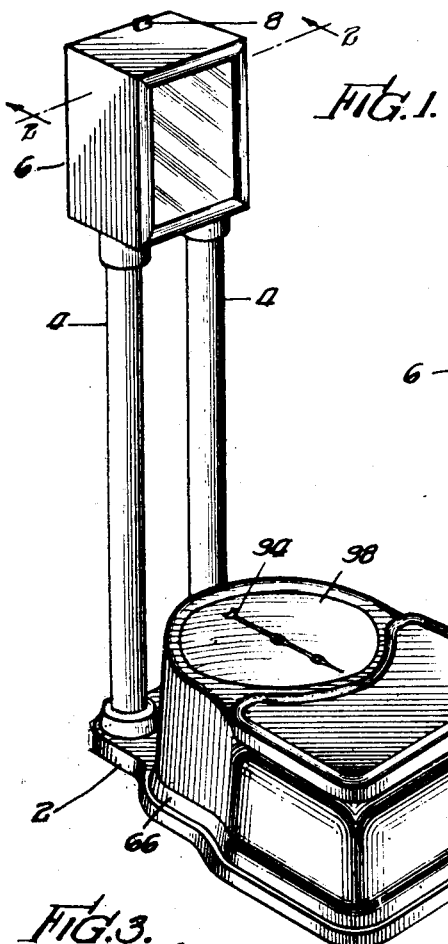
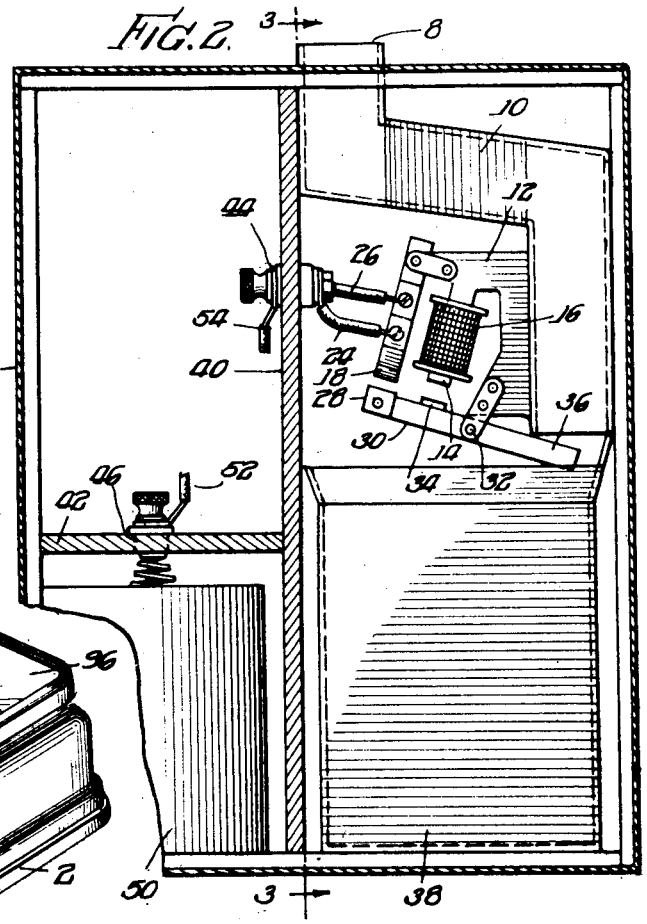
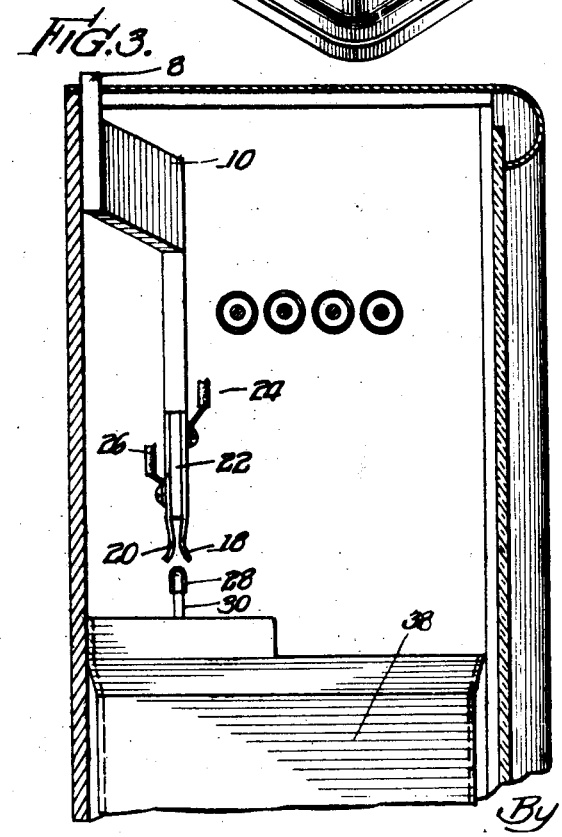
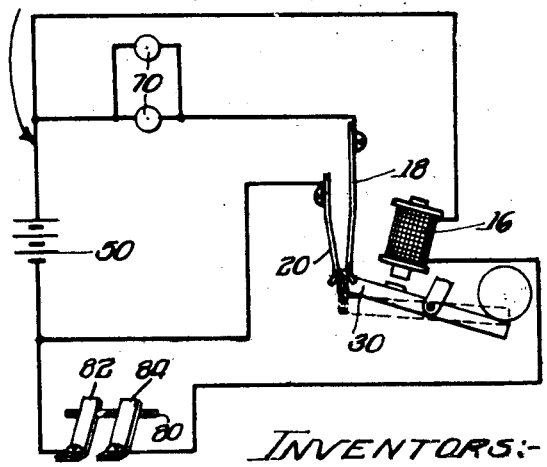
INVENTORS:-
IRVING K. HUTCHINSON
ROBERT A. WOLF Dec. 18, 1934.   I. K. HUTCHINSON ET AL   1,984,412
WEIGHING SCALE
Filed Dec. 30, 1930    2 Sheets-Sheet 2
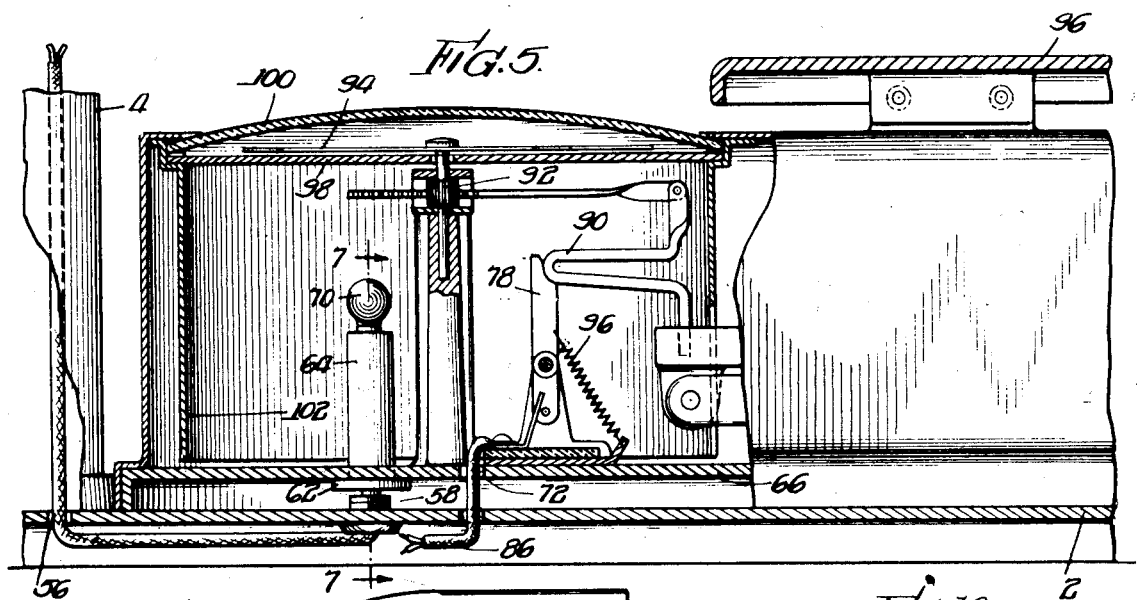
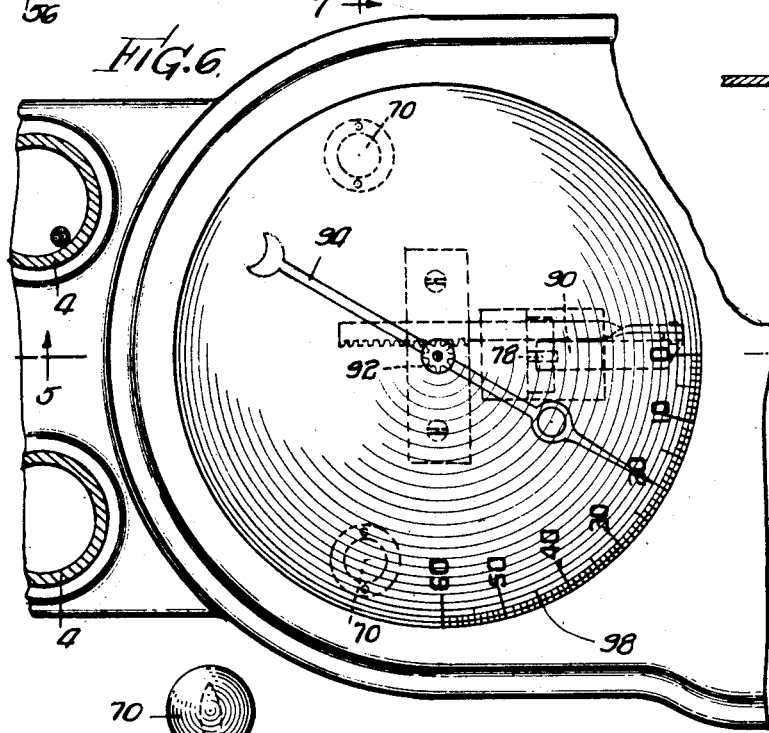
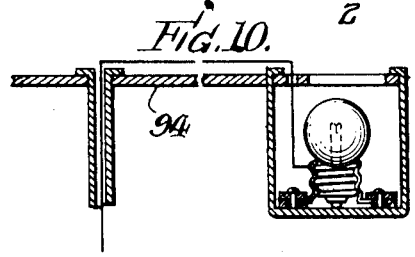
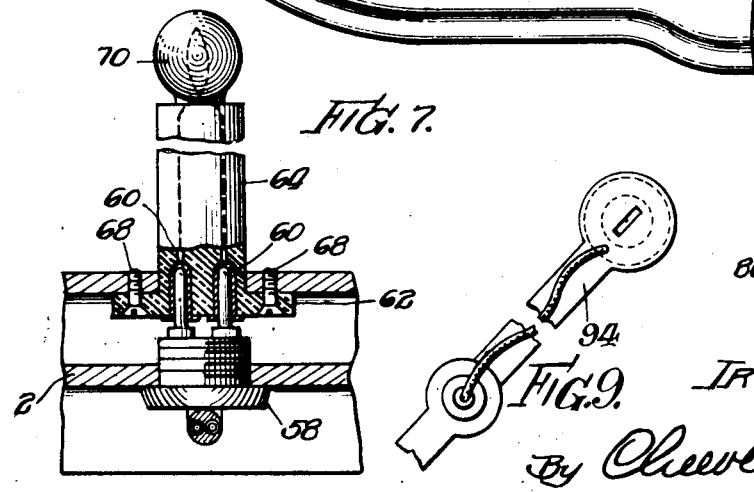
INVENTORS:-
IRVING K. HUTCHINSON
ROBERT A. WOLF Patented Dec. 18, 1934

1,984,412

UNITED STATES PATENT OFFICE 1,984,412

WEIGHING SCALE

Irving K. Hutchinson and Robert A. Wolff, Chicago, Ill., assignors to Continental Scale Works, Chicago, Ill., a corporation of Illinois Application December 30, 1930, Serial No. 505,596

13 Claims. (Cl. 194—9)

Our invention relates to weighing scales, and particularly to weighing scales of the coin-controlled type.

Among the objects of our invention are to provide a coin-controlled weighing scale which is extremely simple in construction and operation, which is cheap to manufacture and cheap to keep in correct operation and easy to repair; and to provide a coin-controlled weighing scale wherein the insertion of the coin brings about, directly or indirectly, the illumination of the weighing dial so as to render the weighing scale and/or the associated weight-indicating pointer or member visible.

Still another object of our invention is to provide such a coin-controlled weighing scale with an arrangement whereby a standard or heretofore known type of so-called bathroom or low type of scale may be utilized in connection with the coin-controlled mechanism by simple connections whereby, if one of such scales becomes defective or inoperative, it may be readily detached from the coin-controlled mechanism and replaced by a similar scale with a minimum of operations.

Yet another object of our invention resides in a provision of the before-mentioned type of scale wherein the means for illuminating the dial or weight-indicating mechanism may be quickly attached to or detached from the scale-operating mechanism, and whereby a standard type of scale thus provided with dial illuminating means may be quickly attached to a base carrying the coin-controlled mechanism, and connections automatically made to the illuminating means when the scale mechanism is attached to the base.

Yet another object of our invention resides in providing a coin-controlled mechanism which is capable of being operatively associated with a standard or heretofore known and used type of bathroom or low type of scale, without modifying the weighing mechanism, but simply by the addition of an electrical switch and a dial-illuminating means, and also by the addition of another type of dial calibration.

These and other objects of our invention will be apparent from a perusal of the following specification, when taken in connection with the accompanying drawings, wherein:

Figure 1 is an illustration of one type of adaptation of our invention, wherein the coin-controlled mechanism is shown as associated with a so-called bathroom or low type of standard weighing scale;

Figure 2 is a section of line 2—2 of Figure 1;

Figure 3 is a section on line 3—3 of Figure 2;

Figure 4 is a diagram of the electrical circuit;

Figure 5 is a section taken through line 5—5 of Figure 6;

Figure 6 is a top view looking down upon the scale;

Figure 7 is a detail of the electrical connection between the base and the scale base carrying the electric light;

Figure 8 is an enlarged perspective view of the switch mechanism which is controlled by the weighing platform of the scale and Figures 9 and 10 are respectively a plan and sectional view illustrating a modified construction of the indicating pointer and the dial.

In the present disclosure of our invention, we have shown the same as associated with a low type of weighing scale, but it must be clear that the invention is adaptable to any type of weighing mechanism which is capable of utilizing the principles thereof. However, from the standpoint of economy of manufacture and operation and cheapness of upkeep, we prefer to utilize our invention as applied to any type of standard scale of the cheaper type, such, for instance, as the so-called bathroom type or low type of scale, one of which type is shown in Figure 1 of the drawings. The features of construction of this type of scale per se are not herein shown and claimed, since our invention is not restricted to the details of such construction. However, for purposes of exemplification, and particularly by reference to Figure 5, we might explain that the features of construction of the type of scale shown therein form the subject matter of an application filed by Mathias J. Weber, Serial No. 374,056, filed June 27, 1929, and assigned to the assignee of the present application.

In the herein disclosed adaptation of our invention, we provide a base 2 which may be of any desirable material, preferably sheet metal or cast metal. This base at one end is provided with an upstanding column carrying the coin-controlled mechanism. In the present instance this column is shown as formed of two spaced-apart tubular members 4 supporting at their top the coin-controlled cabinet 6, having the coin-receiving slot 8 at the top thereof, as shown in Figures 2 and 3. This cabinet contains the coin-controlled mechanism associated with the slot. Preferably it comprises a coin chute 10 and switch mechanism associated therewith to be operated by the coin. This switch mechanism comprises a bracket 12 suitably mounted within the casing 6. This bracket comprises a solenoid including a core 14 and a winding 16, and the bracket in addition carries, insulatedly mounted therefrom, a switch formed of two spaced-apart contacts 18 and 20 with insulation 22 therebetween. The contact 18 of this switch is connected to an electrical wire 24, and the contact 20 of the switch is connected to another electrical wire 26. The switch contacts 18 and 20 are adapted to be made and broken by means of a movable switch blade 28, mounted on the end of a lever 30 pivoted as at 32. The switch blade 28 carried by this lever is arranged to be normally away from the switch contacts 20 and 18, and for this object the lever is arranged so that normally it will remain down by gravity, and will thus break the circuit. If a spring is desirable for this purpose, it may be used. In addition, the lever 30 carries a metal armature 34 adapted to cooperate with the end of the core 14 of the magnet 16. The pivotal mounting for the lever 30 is carried by the bracket 12.

It will be noted that the coin chute 10 is arranged with its discharge mouth immediately over the free end 36 of the lever 30, so that when a coin is inserted in the coin slot 8, it will roll down the chute and strike the free end 36 of this lever, and push the switch blade 28 into connection with the contacts 18 and 20, and thus close the electrical circuit. A suitable coin-receiving box 38 is disposed immediately below the open mouth of the coin chute 10. Access to this coin box may be had through a key-controlled door in the rear of the cabinet. In the present instance we have shown the casing 6 as provided with suitable partitions 40 and 42, carrying electrical connections 44 and 46 for the electrical circuit. In the compartment immediately below the partition 42 we have shown an electrical battery 50 as being the source of electrical current, and this battery is shown as forming a removable contact with the electrical connector 46. The terminals of the electric wires 52 and 54 pass downwardly through one of the columns 4 and into the base of the scale as shown in Figure 5 for connection to the cooperating light and switch mechanism mounted within the scale proper.

The base 2 is provided with an opening 56 through which these electrical connections pass, and the wires then extend to a screw plug 58 screwed into a threaded aperture in the base 2. This screw plug is provided with two upstanding and spaced apart plug contacts 60, which are adapted to make instant but detachable connection with the electric light or lamp base. This lamp base is shown as being carried by a flange 62 having the main body portion 64 of the lamp base passing through an opening in the scale base 66. The flange 62 is held to the scale base by means of the screws 68. The upper end of this lamp base 64 carries a suitable type of electric lamp 70. One or more of these lamps may be used if desired.

The other electrical connections from the coin-controlled mechanism pass through another opening 72 in the base 66 for connection to the switch mechanism shown in Figure 8. This switch mechanism comprises a bracket-like supporting member 74 having an upstanding pivotal bearing 76, on which is pivotally mounted a lever 78. This lever carries at its lower end a crossbar 80, and this crossbar is adapted to make contact with two spaced-apart contact springs 82 and 84, which in turn connect to the electrical wires 86 heretofore described as passing up to the column 4 and to the coin-controlled mechanism. The upper end of the lever 78 is provided with a cut-out or shoulder portion 88 which contacts or cooperates with the folded or apex portion of a substantially V-shaped connector 90 interconnecting the moving mechanism of the scale platform with the rotatable pinion 92, which turns the weight-indicating pointer 94, as set forth in the hereinbefore mentioned application of Mathias J. Weber. Suffice it to say that upon operation of the scale platform, as when some one steps upon the scale platform 96, the V-shaped connector 90 will be moved to shift the pinion 92, and hence the weight-indicating pointer 94. Cooperating with this pointer 94 is a calibrated weight-indicating dial 98. This dial is of special construction and differs from the dial of the standard scale in that the dial is transparent or translucent and is provided with the weight-indicating indicia or calibrations on the under side thereof in such manner that when the dial is not illuminated by the lamp being lit beneath the same, these calibrations cannot be seen, but when the person is on the scale and the coin has been inserted in the slot, the dial will be illuminated and the pointer will move around to indicate the proper weight.

A suitable spring 96 enforces the cooperation of the lever 78 with the V-shaped connector 90.

From the above description it will be seen that when some one steps upon the scale platform 96, the lever 78 will be shifted to cause the contact member 80 to bridge the spaced-apart contacts 82 and 84 to close the circuit through the magnet winding 16. If this circuit be closed in the manner indicated, and if some one then drops a coin into the chute, the coin will raise the contact 28 into switch blade with the two terminals 18 and 20 to close the light circuit, and since the solenoid circuit is closed, the solenoid 16 will be energized by the battery or other source of current, and the armature 34 will be attracted to the core 14, and the lever 30 will move the switch blade 28 into contact with contacts 18 and 20, so that the entire circuit will be held closed. As soon as a person steps off the platform 96, the solenoid circuit will be broken, and the lever 30, carrying switch blade 28, will return by gravity or by spring pressure to lower position to break the battery circuit through the lights.

In some instances we prefer to have the casing 6 entirely separate from the scale mechanism, in which case the column 4 will be dispensed with, and the base extension therefor will be dispensed with, and the coin box will be independent of the scale, so that it can be mounted upon a stand, table, counter or any other suitable support. If this be done, the electrical connections from the coin box and coin-controlled mechanism will consist of flexible cables, which may connect to the electrical circuits of the coin box by means of detachable plugs, like any ordinary detachable plug connection, and in turn will detachably connect with the plug 58 in the base 2, so that if a person's foot gets caught in the flexible connectors, it will be immediately pulled out and no damage done to the parts.

In certain instances, instead of using a battery 50 as a source of current, we may provide the coin box with a transformer and a socket connection to the standard electric light circuit so that the voltage may be properly transformed for illuminating the small lamps 70.

It will also be apparent that instead of having the pointer 94 disposed above the scale dial 98, it may be disposed below the same, so that when the scale is not operating, a complete blank is presented to the eye of the observer, but when the dial is illuminated, the pointer will be seen in outline moving over the face of the calibrations.

In either event the dial is enclosed by means of the usual type of glass plate 100.

It is apparent from the foregoing that our invention is adaptable to any type and construction of scale, and is not necessarily limited to the low type of scale herein shown. However, our invention is particularly adaptable to such a type of scale as we have shown, since it is not necessary to provide complicated scale mechanism, nor is it necessary to change the scale mechanism of any existing type of scale in order to adapt it to our coin-controlled features. It will be noted that the only changes that have been provided on the scale mechanism itself are the utilization of a translucent dial with the scale calibrations arranged on the under side thereof, and the attachment of a switch mechanism 74 to the base of the scale inside the same, and the utilization of one or more lights which may be inserted into the interior of the scale mechanism by providing a threaded bore in the bottom of the scale base and forming suitable electrical connections thereto. In some instances we provide a reflector 102 of desired material, which encloses the lamps and the under side of the scale dial 98 so as to confine the light immediately beneath the scale dial to present better visibility. We may provide an additional number of lights and arrange all of the lights immediately under the peripheral subdivisions or calibrations of the scale so that these subdivisions only are illuminated and the interior or central portion of the scale mechanism is dark; in fact, we may provide a circular disk at the central point with suitable advertising matter thereon, if desired.

In certain instances we may mount the scale pointer 94 on the same shaft in which it is now mounted by disposing it below the dial 98 so that when the illumination takes place, the silhouette of the pointer, as well as the silhouette of the scale indicia, will be seen through the translucent dial 98.

So also, instead of illuminating the dial as a whole, we may as shown in Figures 9 and 10 form the scale pointer as a hollow member having a portion containing a small light with proper electrical connections down through the shaft to the electrical circuit, so that the pointer itself will be illuminated. In this event we provide the upper surface of the scale with the proper weight indications so that they are normally visible, but the scale pointer is mounted beneath the scale dial, which of course is made translucent, so that upon operation of the pointer, the dial will be illuminated at the proper weight indicating point.

In regard to the wiring diagram in Figure 4, our invention also contemplates an arrangement whereby, instead of having the lighting circuit and magnet circuit in parallel, they will be in series, in which case the lighting circuit will be directly in series with the magnet winding 16 and with the switch contacts 18 and 20, indicating the switch mechanism 18, 82 and 84.

The coin-controlled lever 30 closes the switch contacts 18 and 20 when the coin is deposited, and the switch contact 80 closes the contacts 82 and 84 when the scale platform is operated. Obviously in this event, if a person steps upon a scale and does not deposit the coin, the lighting circuit will not be operated until the coin is deposited, whereupon the lighting circuit and the magnet circuit will be instantly closed by the two switches and will remain closed, due to the action of the magnet, until a person steps off the scale. This latter arrangement prevents the magnet circuit being closed each time a person steps upon the scale, in accordance with the diagram shown in Figure 4, and is therefore a simpler and cheaper arrangement.

Having thus described our invention, what we claim as new and desire to secure by Letters Patent is:

1. A scale comprising a casing, a platform shiftably movable thereon, weighing mechanism and weight indicating means comprising a scale dial and an indicator, the same being relatively movable by the weighing mechanism, said scale dial being translucent, a light disposed behind the scale dial, scale indicia disposed between the light and the dial, an electric lighting circuit for said light, including a source of current and a normally open switch, a second circuit, including a source of current and a magnet and a second switch, said second switch being controlled by the movement of the weighing mechanism, and a coin controlled contact member for closing said first named switch, said contact member being held in closed position by said magnet upon the closing of the second named switch.

2. The combination with a self-contained weighing scale comprising a weighing mechanism including a platform and a dial both facing upwardly, of lighting means mounted behind the scale and adapted to illuminate the dial of said scale, said dial being translucent and having weighing indicia on the underside thereof, a base on which the scale is detachably mounted, said base having an upright extending substantially above the scale and means including a coin controlled switch and quick detachable electrical connections from said switch mechanism and said lighting means in the scale to the coin controlled switch on the upright column.

3. In a device of the class described, the combination of a scale having a movable platform, weighing mechanism operated thereby, weight indicating mechanism operated by said weighing mechanism, including two parts relatively movable by said weighing mechanism, one of said parts including a translucent scale dial, means for illuminating the scale dial, and coin controlled switch mechanism for illuminating the light, comprising a casing, a coin chute in said casing, a switch mechanism including a movable contact operated by the passage of a coin through the chute, an associated magnet adapted to cooperate with said movable contact to hold the same in closed position, a source of current, and electrical connections from said source to the magnet and to the lighting means, and a switch in said magnet circuit for closing the same, said switch being operable by movement of a portion of the weighing mechanism.

4. A coin controlled apparatus comprising a base provided with an extension having an upstanding column, coin controlled mechanism mounted at the top of said column, a weighing scale having a translucent dial and detachably supported on said base adjacent said column, a lighting means disposed within said scale beneath the translucent dial thereof, means to actuate the lighting means including a control circuit having coin controlled contacts adapted to be opened and closed, and electrical connections from said coin controlled contacts to said light.

5. In a weighing apparatus, the combination with a self-contained scale comprising a relatively low weighing platform, which may be readily stepped upon by a person desiring to be weighed, weight indicating means arranged snugly with respect to the weighing platform and behind the weighing platform in a position to disclose the indicated weight upwardly, operating means rendering the weight indicating means normally inoperative to indicate the registered weight and electrically operative means to condition the operating means to indicate the registered weight, means formed in the self-contained scale and controlled by the scale platform and in turn controlling the electrically operated means, of a remotely situated control means to actuate the electrically operated means of the scale and electrical connections extending from said control means to the electrically operated means in the weighing scale whereby the weight indicating mechanism may be conditioned for operation only when a weight is on the platform to be weighted and the remotely situated control means has been actuated as by the deposition of a token therein.

6. A weighing scale comprising a weighing platform, weighing mechanism and weight indicating means including a translucent dial and an indicator, the same being relatively movable, means for illuminating said dial, weight calibrations disposed between said lighting means and the dial to be illuminated by said lighting means, a lighting circuit for the light, including a source of power, a switch in said lighting circuit operated by the weighing mechanism, coin controlled means for closing said lighting circuit and separate electrically actuated holding means for maintaining the circuit in closed position as long as a weight to be measured remains on the weighing platform.

7. A weighing scale comprising a weighing platform, weighing mechanism and weight indicating means, including a translucent dial and an indicator, the same being relatively movable, means for illuminating said dial, weight calibrations disposed between said lighting means and the dial to be illuminated by said lighting means, a lighting circuit for the light, including a source of power, a switch in said lighting circuit operated by the weighing mechanism, coin controlled means for closing said lighting circuit, electrically actuated means for maintaining said circuit closed, and means operated by the weighing mechanism for controlling said holding means whereby the same may maintain the lighting circuit in closed position as long as a weight to be measured remains on the weighing platform.

8. The combination with a support base having a seat, of a self-contained scale mounted on said base and resting in said seat, said self contained scale comprising a casing, weighing mechanism mounted in said casing, including a scale platform for operating the weighing mechanism, normally inoperative weight-indicating means comprising a translucent dial and indicator relatively shiftable by the weighing mechanism, normally inoperative illuminating means disposed behind said dial, means forming a scale disposed between the illuminating means and the dial and normally invisible from in front of the dial, conductors arranged in the self-contained scale and adapted to form parts of an electric circuit for actuating the illuminating means, said conductors including a switch controlled by the weighing mechanism whereby the circuit may be conditioned for causing the illuminating means to actuate while a weight remains on the platform, cooperating means formed and arranged in the self-contained scale and in the supporting base and forming a detachable electrical connection whereby the conductors in the self-contained scale are connected with conductors in the supporting base, means in said supporting base and associated with the electrical conductors thereof and comprising coin controlled mechanism for completing the circuit for actuating the illuminating means of the self-contained scale from a remote portion of the supporting base in response to the deposition of a coin.

9. An apparatus as set forth in Claim 1, wherein the platform, the weighing mechanism and weight indicating means, the light, the scale indicia, and portions of the lighting circuit including the second switch, are mounted in a self-contained unit and the remaining portions of the lighting circuit, including the normally open switch, the magnet and the coin controlled member are mounted in a separate self-contained device forming a supporting base having a seat for receiving the self-contained unit demountably therein and means formed and arranged in the self-contained device and in the self-contained unit for detachably connecting the portions of the lighting circuit in the unit with the remaining portions of said circuit in the device when the unit is mounted in place on the device.

10. A coin controlled apparatus comprising a base provided with an extension having an upstanding column, coin controlled mechanism located in said column, a self-contained weighing scale detachably mounted on said base adjacent said column, said scale having normally invisible weight indicating means, lighting means disposed within said scale in position to illuminate the weight indicating means to render same visible and means to actuate the light means including an electrical control circuit operatively connected with the coin controlled mechanism in said column and adapted to be influenced thereby and extending into the self-contained weighing scale and operatively connected with the lighting means therein to control the operation of the same and detachable electrical connections in said control unit providing the separation of said circuit at the point where it enters the weighing scale to permit the scale to be removed from the base without disturbing the physical position of the control circuit.

11. A weighing scale comprising a weighing platform, weighing mechanism connected to the platform and weight-indicating means connected to the weighing mechanism including a dial and indicator relatively movable by the weighing mechanism in response to the deposition of a weight on the platform, lighting means for illuminating said dial, an operating circuit for said lighting means including a switch in said circuit operated by the weighing mechanism, coin-controlled means for closing said lighting circuit and separate electrically actuated holding means for maintaining the circuit closed as long as a weight to be measured remains on the weighing platform after the actuation of the coin-controlled means.

12. The combination with a self-contained weighing scale comprising weighing mechanism including a platform and weight-indicating means including a relatively shiftable dial and indicator operable in response to the deposition of a weight on said platform, of switch mechanism disposed within the scale and adapted to be operated by the movement of a portion of said weighing mechanism, lighting means controlled by said switch mechanism for illuminating said dial, a base on which the scale is detachably mounted, said base comprising a support carrying a coin-controlled switch and detachable electrical connections from said coin-controlled switch to the lighting means within the scale.

13. A weighing device comprising a scale comprising weighing mechanism including a platform and weight indicating means comprising a dial and indicator relatively shiftable in response to the deposition of a weight on the platform, lighting means to illuminate the dial, and control means for said lighting means including a coin-controlled switch and a weight-controlled switch whereby the illuminating means is energized upon the contemporaneous deposit of a coin and the presence of a weight on the platform, said control apparatus including means for maintaining the light in operation until the weight is removed from the platform.

IRVING K. HUTCHINSON.
ROBERT A. WOLFF.